(12) United States Patent
Tashima

(10) Patent No.: US 7,897,862 B2
(45) Date of Patent: Mar. 1, 2011

(54) STRINGED INSTRUMENT LEARNING AND TEACHING METHOD, MUSIC NOTATION SYSTEM, AND CORRESPONDING VISUAL AID

(76) Inventor: Spencer Saburo Tashima, Santa Cruz, CA (US)

( * ) Notice: Subject to any disclaimer, the term of this patent is extended or adjusted under 35 U.S.C. 154(b) by 0 days.

(21) Appl. No.: 12/110,322

(22) Filed: Apr. 27, 2008

(65) Prior Publication Data

US 2009/0266223 A1 Oct. 29, 2009

(51) Int. Cl.
*G09B 15/02* (2006.01)

(52) U.S. Cl. ............... 84/483.2; 84/483.1; 84/312 R

(58) Field of Classification Search ........... 84/483.1, 84/483.2, 312 R
See application file for complete search history.

(56) References Cited

U.S. PATENT DOCUMENTS

| | | | | |
|---|---|---|---|---|
| 26,361 A * | 12/1859 | Marquis | ............... | 84/471 R |
| 122,096 A * | 12/1871 | Acee | ............... | 84/483.1 |
| 138,104 A * | 4/1873 | Stewart | ............... | 84/483.1 |
| 429,841 A * | 6/1890 | Clements-Kropp | ........ | 84/483.1 |
| 438,429 A * | 10/1890 | Clemens | ............... | 84/483.2 |
| 608,771 A * | 8/1898 | Guilford | ............... | 84/471 R |
| 663,512 A * | 12/1900 | Peterson | ............... | 84/483.2 |
| 881,085 A * | 3/1908 | Shires | ............... | 84/483.1 |
| 1,168,153 A * | 1/1916 | Boswell et al. | ........ | 84/312 R |
| 1,646,574 A * | 10/1927 | Buzza | ............... | 84/483.1 |
| 3,196,731 A * | 7/1965 | Ingley | ............... | 84/476 |
| 3,403,590 A * | 10/1968 | Quinton | ............... | 84/470 R |
| 3,698,277 A * | 10/1972 | Barra | ............... | 84/483.1 |
| 4,291,606 A * | 9/1981 | Lepage | ............... | 84/291 |
| 5,458,040 A * | 10/1995 | Lawrence, Jr. | ........ | 84/473 |
| 6,388,182 B1 * | 5/2002 | Bermudez | ............... | 84/477 R |
| 7,084,340 B2 * | 8/2006 | Tan | ............... | 84/477 R |
| D529,092 S * | 9/2006 | Ambrose, Sr. | ........ | D19/62 |
| 7,241,945 B1 * | 7/2007 | Egan | ............... | 84/483.2 |
| 7,408,105 B2 * | 8/2008 | Murdock | ............... | 84/477 R |
| 7,521,619 B2 * | 4/2009 | Salter | ............... | 84/477 R |
| 7,750,225 B2 * | 7/2010 | Rebstock | ............... | 84/483.2 |
| 2002/0011142 A1 * | 1/2002 | Mead | ............... | 84/477 R |
| 2003/0010182 A1 * | 1/2003 | Muller | ............... | 84/483.1 |
| 2006/0137512 A1 * | 6/2006 | Lassar | ............... | 84/483.2 |
| 2008/0202318 A1 * | 8/2008 | Mataele | ............... | 84/483.2 |

(Continued)

OTHER PUBLICATIONS

Roth, Arlen, Traditional, Country and Electric Slide Guitar (1975, Oak Publications, New York)., pp. 64 and 65.*

(Continued)

*Primary Examiner*—Elvin G Enad
*Assistant Examiner*—Robert W Horn

(57) ABSTRACT

A simplified playing method and music notation system for the learning and teaching of playing the guitar, banjo, ukulele, or similar stringed instrument, primarily for use as accompaniment to singing. One embodiment of the method is comprised of 2 parts: 1. A notation system which specifies non-standard tuning information (24), specifies movable chord fingering information[(40), (42)], and uses numbers (20), letters, colors (64), or symbols to specify the fret space locations to implement the movable chord fingering, and 2. A modification to the instrument, adding a corresponding (numbered, colored, etc.) fret designation visual aid [(34), (68)] to indicate where to place the movable chord fingering on the neck of the instrument. Since most chord changes are made simply by moving one simple chord shape up and down the fretboard, and the notation system is very easy to read, learning to play the instrument becomes significantly faster and easier.

2 Claims, 12 Drawing Sheets

U.S. PATENT DOCUMENTS

2009/0266223 A1* 10/2009 Tashima .................... 84/485 R

OTHER PUBLICATIONS

Braille music and Louis Braille (1809-1852), viewed at en.wikipedia. org/wiki/Braille_music and /Louis_Braille on Sep. 22, 2009.*
In-line chord example, viewed in 2005, Arrangement of Gaterhing Flowers. . . .*
Sheperd, Danny, citations from Mountain Dulcimer for Children, showing songs based on numeric chords, corresponding to fret numbers, cited Sep. 21, 2009 at http://www.mountaindulcimerforchildren.com.*
Open D tuning, viewed Feb. 24, 2010 at http://en.wikipedia.org/wiki/Open_D_tuning, provides a teaching of DADAAD, DADADD.*
Snakes & Arrows, released May 2007, wherin is used DADAAD tuning, viewed at http://en.wikipedia.org/wiki/Snakes_%26_Arrows on Feb. 24, 2010.*
The McNally Strumstick, Songs Area, p. 4 © 2000-2001, viewed Apr. 21, 2010 at http://www.strumstick.com/html_pages/sssongpage04.html.*
The Strumstick Instructions Area © 2000-2005 viewed Apr. 21, 2010 at http://www.strumstick.com/html_pages/Strumstick%20Instruction%20Area.htm.*
Strumstick: Chords viewed Apr. 21, 2010 at http://www.strumstick.com/html_pages/Instr%20Chords.htm.*
MacFarlane, Patrick, Lesson 20: Bar Chords © 1996-2007 viewed Apr. 22, 2010 at http://www.guitarlessonworld.com/lessons/lesson20.htm.*

* cited by examiner

Silent Night — 24

Tuning: D,A,D,A,A,D
Primary chord shape: N = NNN000 or "Nth Fret"  26

20 First singing note: 2nd or 3rd string, open. ———— 28

Ø    Ø    Ø    Ø — 22
Silent Night, Holy Night 7    7    Ø    Ø
All is calm, all is bright 5    5    Ø    Ø
Round yon virgin, Mother and Child 5  5    Ø    Ø
Holy infant so tender and mild 7    7    9    5
Sleep in Heavenly pe - ace Ø    7    5    Ø
Sleep in Heavenly peace

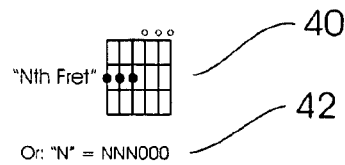
Fig. 3 - Prior Art Notation
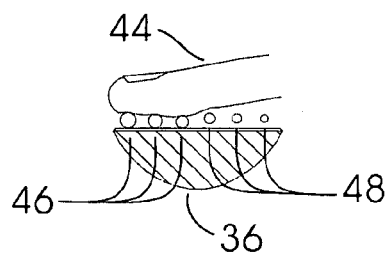
Fig. 4A
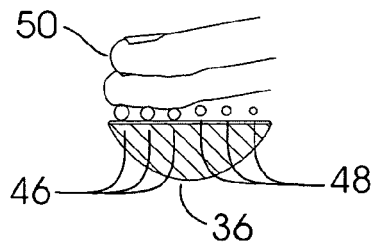
Fig. 4B
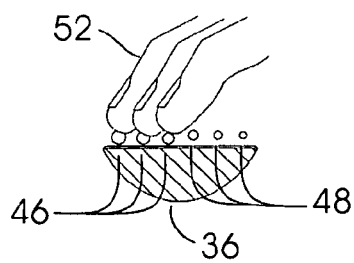
Fig. 4C
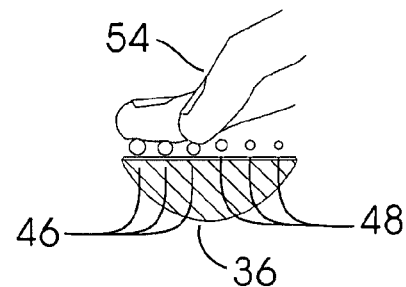
Fig. 4D
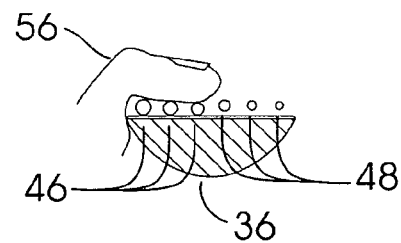
Fig. 4E
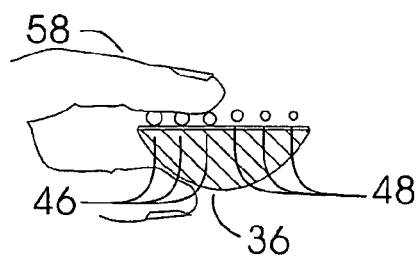
Fig. 4F

Silent Night
Tuning: D,A,D,A,A,D
Primary chord shape: N = NNN000 or "Nth Fret"

First singing note: 2nd or 3rd string, open.

Si - lent Night, Ho - ly Night,

All is calm, all is bright,

Round yon vir - gin, Mo - ther and child

Fig. 5

Silent Night — 24
Tuning: D,A,D,A,A,D
Primary chord shape:   Color = "Fret Color",
                       White = no fingering
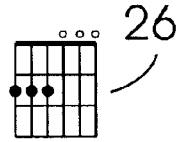
First singing note: 2nd or 3rd string, open. ——— 28
| White |
| Si - lent Night,  Holy  Night |
| Red | White |
| All  is calm,  all  is bright |
| Yellow | White |
| Round  yon vir - gin, Mo - ther and Child |
| Yellow | White |
| Ho - ly in - fant so ten - der and mild |
Sleep   in Hea - ven - ly  peace
| White | Red | Yellow | White |
Sleep   in Hea - ven - ly  peace
Fig. 7

Fig. 9 - Prior Art Chord Notation Methods

Fig. 11 Prior Art Learning process

STRINGED INSTRUMENT LEARNING AND TEACHING METHOD, MUSIC NOTATION SYSTEM, AND CORRESPONDING VISUAL AID

CROSS-REFERENCE TO RELATED APPLICATIONS

Not Applicable

FEDERALLY SPONSORED RESEARCH

Not Applicable

BACKGROUND

1. Field of the Invention

This invention relates generally to the art of music. More particularly, it relates to the art of playing music (generally musical chords) on stringed instruments.

2. Background and Description of the Related Art

Existing methods for learning how to play chords on a guitar, banjo, ukulele, or similar chord producing stringed instrument traditionally require a lengthy startup phase. It may take weeks before a beginner can successfully complete even a simple three chord song, using chord shapes D, G, and A, for example.

Current available methods of instruction require a new student to learn to translate either traditional note notation, chord charts, tablature chord notation, or musical chord names, such as "Bm7" into accurate chord fingering shapes (see FIG. 9, an illustration of prior art).

To play a three chord song using the D, G, and A chords, the beginner must first conceptually learn which strings in which frets must be pressed down to form the D chord. Once this is accomplished, the beginner must learn to physically form their fingers into the shape required to press the appropriate strings and leave the other strings untouched. This step can take a fair amount of time in itself and can be very frustrating for the beginner.

After successfully learning to finger the D chord shape, the beginner must repeat the above steps for the G chord and again for the A chord. Learning to successfully finger each chord can be fairly time consuming for a beginner. After successfully accomplishing the above for all three chord shapes, the beginner must learn to quickly change hand shapes from one chord shape to the next in the proper tempo. This last step is also takes a lot of time before success is achieved and can be very frustrating for the beginner.

Only after completing all of the above, can a beginning player successfully complete and play even a simple three chord song. After achieving success with the three chords above, the process repeats itself for each new chord that a beginner tries to learn; each new chord has a unique chord shape to memorize and to learn to properly finger.

Additionally, songs played in a traditional manner commonly use bar chords requiring one finger to press multiple strings and adding one or more (typically 2 or 3) additional fingers pressing down strings in order to achieve the correct chord. Many beginners find these multi-fingered bar chords to be very, very difficult and frustrating as well, and progress often stops when multi-finger bar chords are required to play a given musical composition.

Finally, pressing down on individual strings can initially be very painful for the beginner, until calluses are formed on the fingertips from repeated use.

The lengthy startup period and other factors described above often leads to beginners giving up on learning how to play a stringed instrument, due to pain, frustration and lack of success.

At the present time, there is no systematic instructional alternative to learning multiple, complex chord shapes by reading and translating traditional music notation, visual chord charts, tablature chord notation, or musical chord names into fingering shapes. Although many alternate tunings have been used extensively in prior art on a case-by-case basis, no simplified notation system or systematic method of instruction currently exists.

Many alternate music notation systems have been introduced by others, but generally fall into the following categories: 1. Numbering keys on a piano keyboard, numbering fingers used, or re-naming notes; 2. Modifying the traditional musical staff; 3. Using different symbols or colors for notes on a staff; 4. Modifying tablature used for stringed instruments; 5. Using graphic representations of notes; or 6. Combinations of the above. There is no prior art music notation system similar to the fret numbering chord notation used in the current invention devoid of tablature, chord names or musical staff.

Many visual training aids for fingering chords on the guitar, etc., with visual chord fingering information or musical scale information attached to the instrument have been proposed, but none provide fret identification information for use with a corresponding simplified notation and fingering system where the key information needed is what fret to use. Guitars have been manufactured for hundreds of years, but have not been manufactured with each fret location marked as proposed in this invention. This is due to the fact that much of the utility of this marking is gained through the use of the new method proposed. Beginners using prior art methods typically start learning chords in first position, and do not venture up the neck or need to know where the $9^{th}$ fret is, for example, until they are more advanced and are already familiar with the neck of the instrument.

This invention provides a means to drastically reduce the time required to learn to play chords on a stringed instrument by eliminating the major obstacles to success, including the elimination of the need to learn and physically execute multiple chord fingering configurations and the elimination of the need to learn and memorize chord names and their corresponding fingering shapes.

SUMMARY

This invention is a simplified playing method, note and chord music notation system, and corresponding visual or tactile aid modification to the instrument for the learning and teaching of playing the guitar, banjo, ukulele, or similar stringed instrument, primarily for use as accompaniment to singing.

One embodiment of the method is comprised of 2 parts: 1. A notation system which specifies non-standard tuning information, specifies movable chord fingering information, and uses numbers to specify the fret space locations where the movable chord fingering is implemented, and 2. A modification to the instrument, adding a corresponding numbered fret designation visual aid to indicate where to place the movable chord fingering on the neck of the instrument.

In another embodiment of the method, the notation system described above uses colors to specify the fret space locations where the movable chord fingering is implemented, along with a corresponding colored fret designation visual aid on the neck of the instrument to indicate where to place the movable chord fingering on the neck of the instrument.

In yet another embodiment of the method, for visually impaired users, the notation system described above uses literary Braille to specify the fret space locations where the movable chord fingering is implemented, along with a corresponding tactile aid on the neck of the instrument to indicate where to place the movable chord fingering on the neck of the instrument.

From the description above, a number of advantages of some of the embodiments of the present invention become evident, including the fact that user of the invention gains high functionality after learning to finger only one relatively simple chord shape and without the need to learn to read music, music tablature, or memorize chord names and their corresponding fingering shapes.

Other aspects and advantages of the present invention will become apparent from the following detailed description, taken in conjunction with the accompanying drawings, illustrating by way of example the principles of the present invention.

DRAWINGS-FIGURES

In the drawings, closely related figures have the same number but different alphabetic suffixes.

FIG. 3 shows a prior art chord chart and prior art tablature notation for a movable chord shape used in the system.

FIGS. 4A, 4B, 4C, 4D, 4E and 4F show the many possible fingering options to implement the movable chord shape (from FIG. 3), shown in the cross-sectional view of the neck indicated by the section lines 4-4 in FIG. 2, FIG. 8, FIG. 12 and FIG. 13.

FIG. 5 is an embodiment of the notation system used in conjunction with Common Music Notation for the melody line.

FIG. 7 is another embodiment of the notation system, using colored bars instead of numbers.

Figure 9:
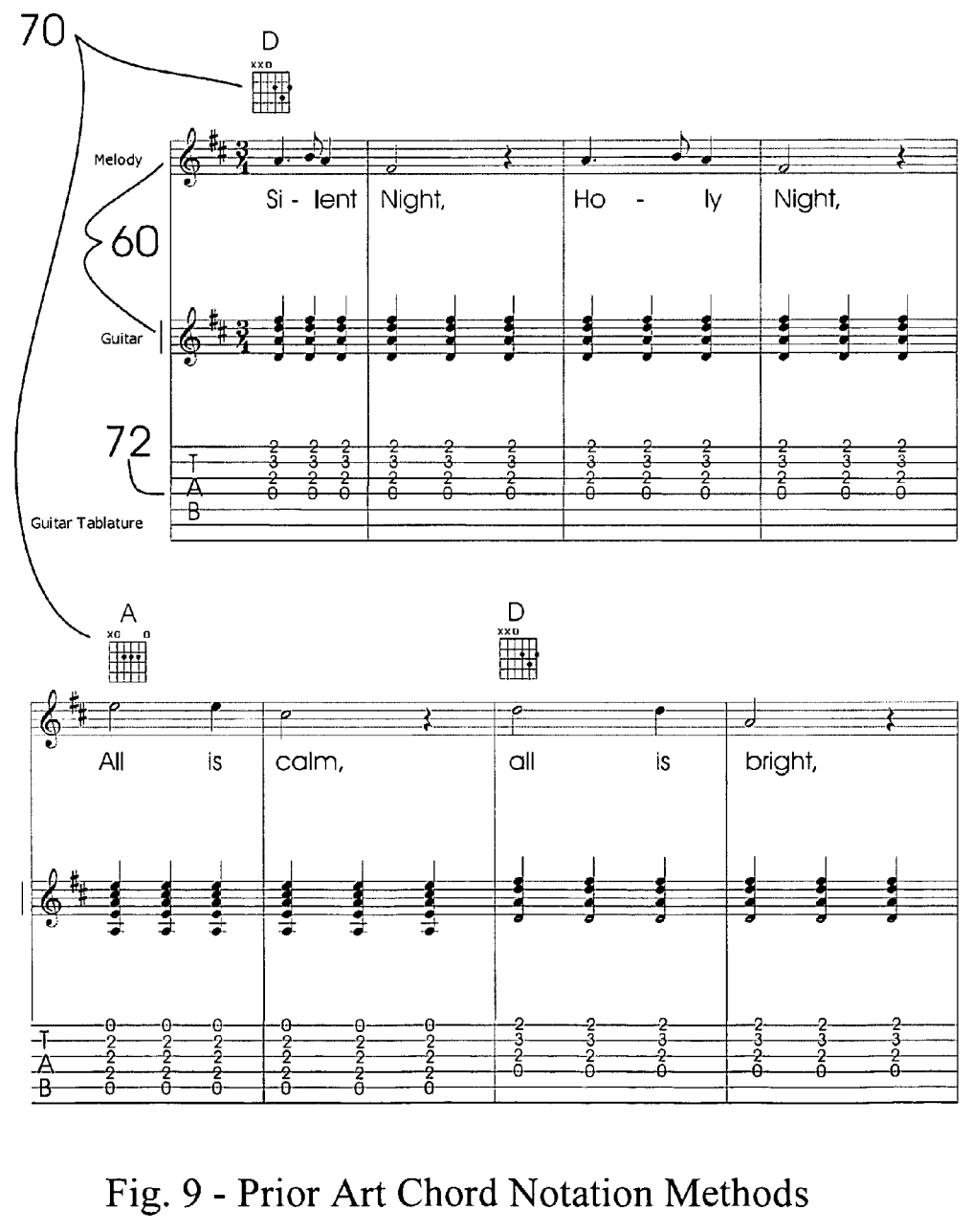

FIG. 9 illustrates prior art chord notation methods.

Figure 1:
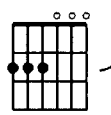
FIG. 1 is an embodiment of the notation system applied to a song in a simple form—the chord notation number shown in relation to the words of the song.

The figures are provided in order to provide a thorough understanding of the embodiments of the present invention. The figures should not be construed as limiting the breadth of the invention in any manner.

DETAILED DESCRIPTION

An invention for methods and apparatuses for playing music on multi-string instruments is disclosed. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

While this invention has been described in terms of several preferable embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as falling within the true spirit and scope of the invention.

The present invention is a simplified method of playing a multi-stringed instrument, an embodiment of which is comprised of 2 parts: A notation system which specifies non-standard tuning information, specifies movable chord fingering information, and uses numbers to specify the fret space locations where the movable chord fingering is implemented, and 2. A modification to the instrument, adding a corresponding numbered fret designation visual aid to indicate where to place the movable chord fingering on the neck of the instrument.

Once the present invention is understood, a number of advantages of the embodiments of the notation system, visual/tactile aid and method of playing (referred to herein as "The Invention") become evident:

1. The Invention eliminates the need to learn to read traditional note notation and/or chord names and translate them into fingering shapes and requires only a minimal amount of chord chart reading skill or tablature notation reading skill.

2. The Invention eliminates the need to learn to properly finger new chord shapes for every new chord learned. High levels of functionality can be achieved after learning to implement only one movable chord shape. For example, with only one shape, a minimum of nine different and harmonically useful chords can be played on a guitar by a user of The Invention.

3. The Invention eliminates the need to learn to quickly change fingering from one chord shape to another chord shape. Typically, to change chords using The Invention, the primary chord shape is simply moved up and down the neck of the instrument, or removed completely.

4. The Invention drastically reduces the time required (from weeks down to minutes, potentially) for a beginning player to achieve initial success playing a complete, multi-chord musical composition on the instrument.

5. The Invention gives the player many possible fingering options to choose from, increasing the probability of initial success.

6. Many of the chord fingering options available to the user of The Invention (where a user presses multiple strings using the side of a finger or thumb) significantly reduce the pain that a beginning player normally experiences due to the traditional practice of pressing down a single string with a fingertip.

7. The Invention is very useful for songwriters, and students of song structure, since chord progressions of songs played using The Invention become readily apparent. Chord progressions are easy to analyze and implement.

8. The chords created using The Invention are musically complex chords, many of which that are traditionally only used by more advanced players, so The Invention is useful to beginners through advanced players.

9. In short, The Invention substantially eliminates the major mental and physical complexity factors contributing to pain and frustration encountered by a beginning player, facilitates virtually instant success for beginners, and at the same time, provides value to advanced players, including songwriters.

With this overview in mind, the following figures will illustrate example, structure, and functionality of the apparatus and methods for a simplified playing method and corresponding visual/tactile aid for the learning and teaching of playing a stringed instrument. For simplicity, all examples shown shall be for the guitar, but the concepts also apply to similar chord producing stringed instruments, such as ukuleles, banjos, mandolins, etc.

FIG. 1 shows a preferred embodiment of the chord notation system using numbers (20) to designate the fret at which to finger the movable chord shape (26) with the instrument tuned as instructed (24). The null symbol "Ø" represents no chord fingering is used. When applied to a song, this is a simple form of the notation, indicating what chord to use in relation to the lyrics (22) of the song. Additional information may be added, such as musical notation for the melody line, strum pattern to be used, etc., but this figure illustrates the essence of the chord notation system.

Figure 2:
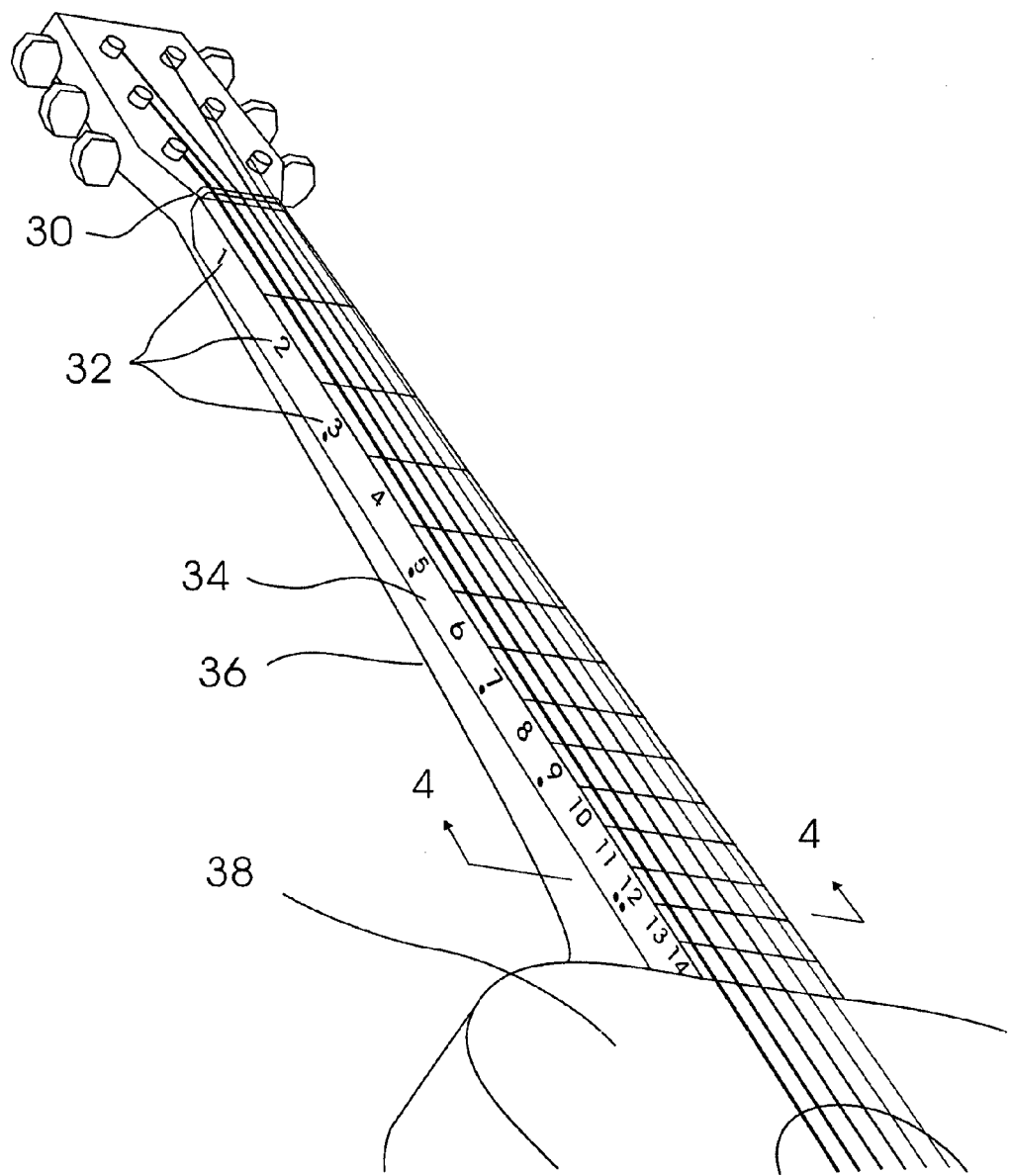
FIG. 2 is a perspective view of an embodiment of the fret marking label with fret numbers attached to the neck of an instrument.

FIG. 2 shows a preferred embodiment of the fret markings (32) which correspond to the numbers (20) used in the chord notation system of FIG. 1. While it is very possible to use this invention's playing method without the fret markings, the fret marking on the neck of the instrument provides a clear visual aid to help finger the chord at the correct location. A simple way to add this marking to existing instruments is to affix an adhesive label (34) to the side of the neck of the instrument marked with the fret numbers (32) which correspond to the numbers (20) in the chord notation system. The label (34) can be affixed temporarily or semi-permanently. Alternatively, the markings can be built into, or added permanently or semi-permanently to the instrument using ink, inlay, permanent decal or other means. Another alternative is to affix a removable, reusable label that is customized for a specific song or songs. The main purpose of the fret number markings (32) is to function as a visual aid correlating directly to the chord notation system information.

FIG. 3 shows a prior art chord chart (40) and equivalent prior art chord tablature (42) showing a preferred embodiment of a movable chord shape that is specified by a number "N" (where N=0 [or Ø], 1, 2, 3, . . . etc.,) in the chord notation system in FIG. 1 when used with a family of tunings with a root note, a major $5^{th}$ above the root note, and the octave of the root note, such as: D3, A3, D4, A4, A4, D5 (the tuning options will be explained in greater detail below). The number "N" signifies fretting the three lowest pitched strings at fret number "N" and leaving the other three strings open. When N=0, or Ø, all strings are left open. One way to write this is in tablature chord notation (42), where "N" signifies the chord: NNN000. For example, if N=5, the chord is 555000, which means the three lowest pitched strings are fretted at the $5^{th}$ fret and the other three strings are left open.

Figure 12:
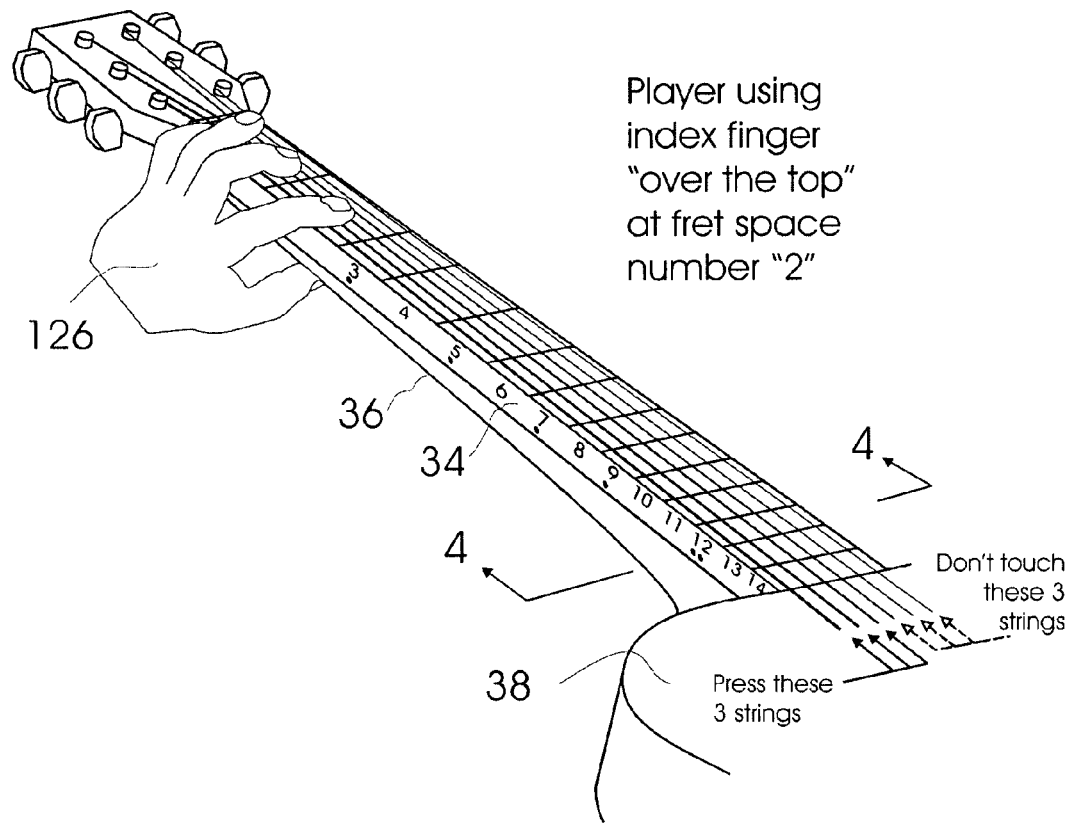
FIG. 12 is a perspective view of fingering option of FIG. 4F, index finger only, "over the top," as applied to the instrument.
Figure 13:
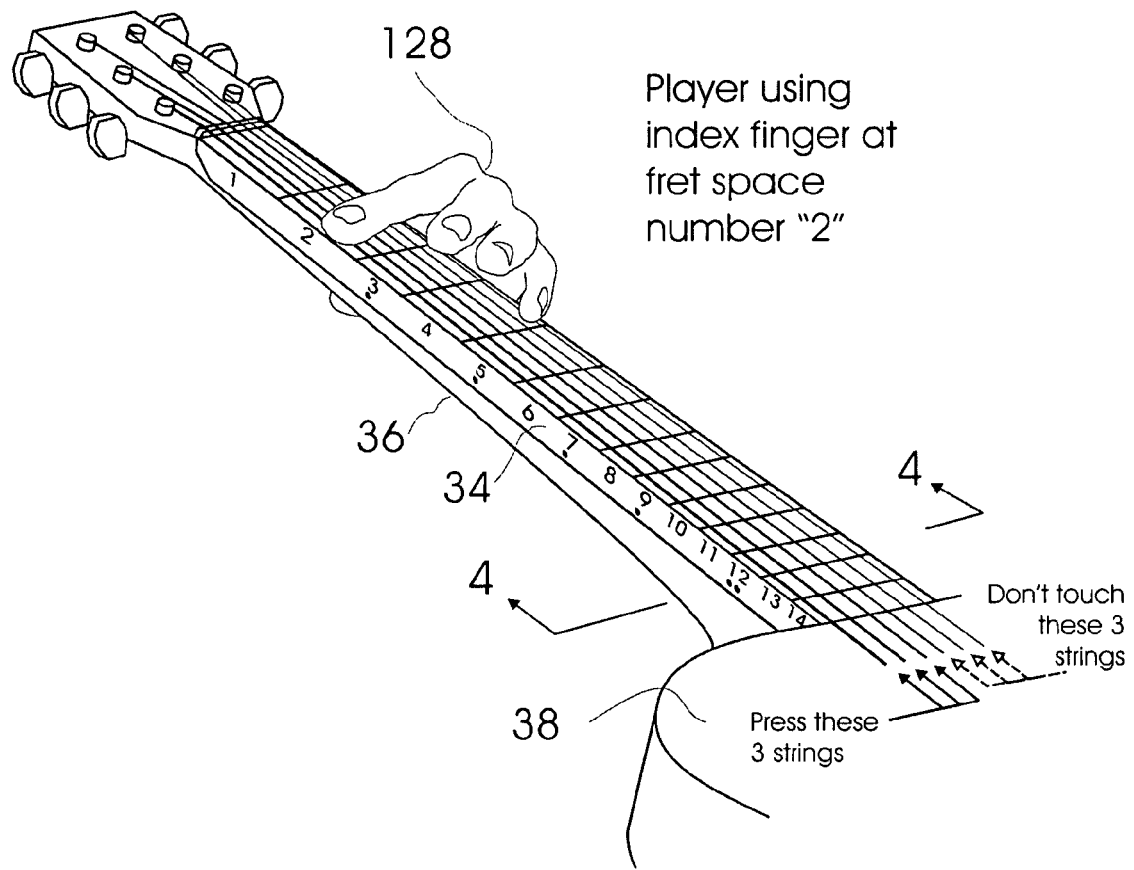
FIG. 13 is a perspective view of fingering option of FIG. 4A, index finger only, as applied to the instrument.

FIGS. 4A, 4B, 4C, 4D, 4E and 4F shows many of the possible fingering methods [(44), (48), (52), (54), (56) and (58)] that can be used to create a partial bar chord fingering that can be used in this system. This flexibility allows a player to choose the method that is the easiest and most comfortable to use. Most users may find that using the index finger only, over the top of the neck as shown in FIG. 4F and with the hand position (126) shown in relation to the instrument (38) in FIG. 12 will be the easiest way to start out. The user is free to choose the most effective fingering method to start with, and as a user progresses, multiple fingering methods can be used.

OPERATION

Operation of a preferred embodiment of the present invention is described below. Prior to using the simplified notation system to play a musical composition on the instrument, the instrument can be optimally prepared as follows:

1. A numerical visual aid (34) is placed on the side of the neck of the instrument as in FIG. 2.

2. The instrument must be tuned as instructed (24) on the musical notation sheet, FIG. 1. In this embodiment, the tuning used is D3, A3, D4, A4, A4, D5 (151551). The family of tunings that can be used will typically contain a root bass note, the major $5^{th}$ above that note and unisons and/or octaves of these two notes. The attributes of the family of tunings that are most useful are: 1) Bass strings tuned to some combination of root notes (including unisons and octaves) and the major $5^{th}$ above the root notes (including unisons and octaves) and 2) Treble strings tuned to some combination of octaves of the root note and the major $5^{th}$ above the root note, or the said notes transposed by the same interval, so they become octaves of the root note and the major $5^{th}$ above the root note of a chord created by fretting the bass strings. For example, using the tuning D3, A3, D4, A4, A4, E5, becomes A3, E4, A4 A4 A4 E5 (151115) when the three bass strings are fretted at the $7^{th}$ fret.

Once the visual aid (34) is placed on the neck of the instrument (36) and the instrument is tuned, a musical composition is ready to be played using the chord notation system.

To begin, first fret, if necessary, and play the first singing note. For example, in "Silent Night," shown in FIG. 1, play the $2^{nd}$ or $3^{rd}$ string, open (unfretted). This information is provided to the user (28). This is the first note for singing.

For the beginning of Silent Night, the first chord is "Ø" (20), which means all strings are left open (chord=000000), as shown in FIG. 1 (26) and FIG. 3 (40, 42). To start out, play a basic strumming pattern, such as using a down strum every time a number or "Ø" appears, while singing the song. Begin to sing the lyrics (22) and strum with a downstroke every time a "Ø" appears above a word that is being sung.

When the word "All" is sung, the chord changes to "7" (20), which means finger the three lowest pitched strings at the $7^{th}$ fret (chord=777000), as shown in FIG. 1 (26) and FIG. 3 (40, 42). Refer to the visual aid (34) in FIG. 2, and finger the strings where the number 7 appears on the neck, using any of the fingering techniques illustrated in FIGS. 4A through 4F [(44), (50), (52), (54), (56) and (58)]. Continue to sing and strum every time a "7" appears.

Back to FIG. 1, when the next "All" is sung, the chord changes back to "Ø" (20), which means remove all fingering again (chord=000000). Continue to sing and to strum every time a "Ø" appears.

When the word "Round" is sung, the chord changes to "5" (20), which means finger the three lowest pitched strings at the $5^{th}$ fret (chord=555000), as shown in FIG. 1 (26) and FIG. 3 (40, 42). Again, refer to the visual aid (34) in FIG. 2, and finger the strings where the number 5 appears on the neck, using any of the fingering techniques illustrated in FIGS. 4A through 4F [(44), (50), (52), (54), (56) and (58)]. Continue to sing and strum every time a "5" appears.

Back to FIG. 1, when the word "Mother" is sung, the chord changes back to "Ø" (20), which means remove all fingering again (chord=000000). Continue to sing and strum every time a "Ø" appears.

Playing and singing continues in like manner through the end of the song. Note: the notation system (20) and corresponding visual aid (34) mainly provide information related to where to place the movable chord fingering (or remove it) to implement a given chord at a given time.

When played in this manner with the instrument tuned per the tuning instructions in FIG. 1 (24), the chords produced when fretted at frets Ø through 12 are as follows:

Ø (or 0)=000000=D5
1=111000=D#maj7,aug4
2=222000=E7sus4
3=333000=F6
4=444000=F#m6
5=555000=Gsus2
6=666000=G#m2,aug4
7=777000=Asus4
8=888000=A#maj7
9=999000=Bm7
10=10,10,10,000=C/D or C6sus2
11=11,11,11,000=C#m2,m6
12=12,12,12,000=D5

The Ø, 2, 4, 5, 7, and 9 chords above are useful for musical accompaniment, since they roughly follow the diatonic chord progression used in many songs: I, ii, iii, IV, V, and vi, where Ø=I, 2=ii, 4=iii, 5=IV, 7=V, 9=vi. Note: the 2 chord more faithfully fits the diatonic progression as a full bar or muted upper notes (222222 or 222xxx, where a string marked with an "x" instructs the user not to strum that string). In the proper musical context, virtually all of the chords produced can be musically useful. So the end result of the system is that many, many songs can be played using only one movable chord shape that can learned in a relatively short period of time. The notation system and accompanying visual aid provide the user with the information required to achieve success quickly and easily.

Figure 10:
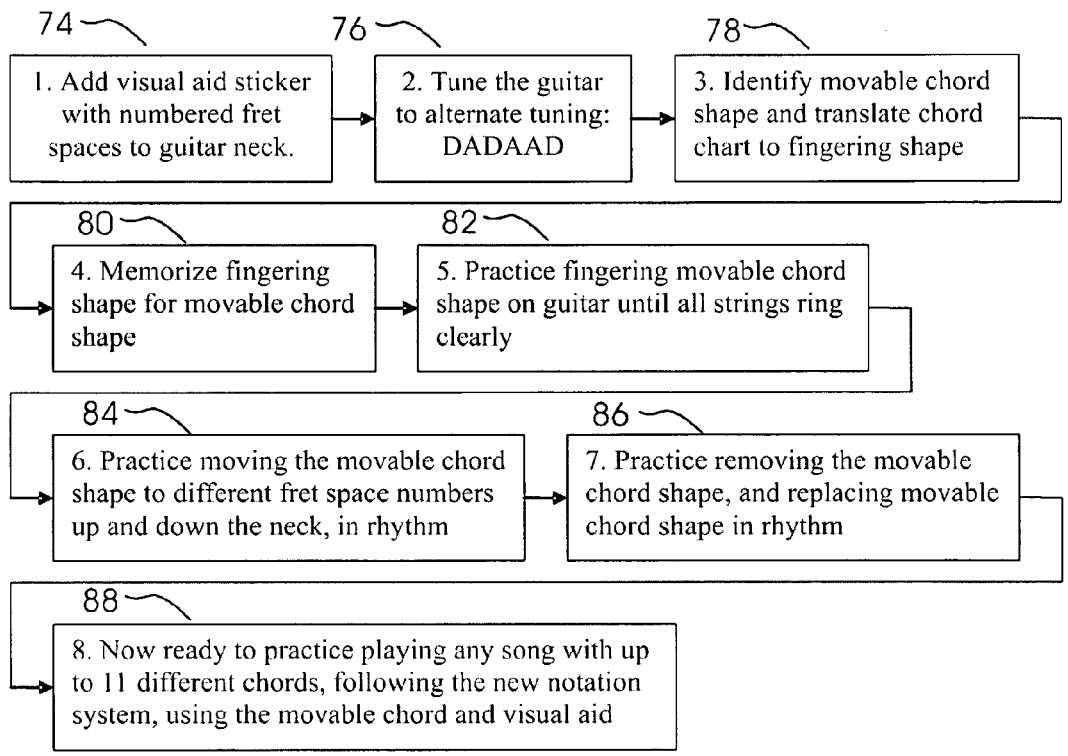
FIG. 10 is a flow chart for the learning process of the present invention and applies to songs with up to 11 different chords, using one movable chord shape.

FIG. 10 is a flow chart that summarizes the present invention's operational steps required to learn to play a song on the guitar with up to 11 different chords, using one movable chord shape.

Figure 11:
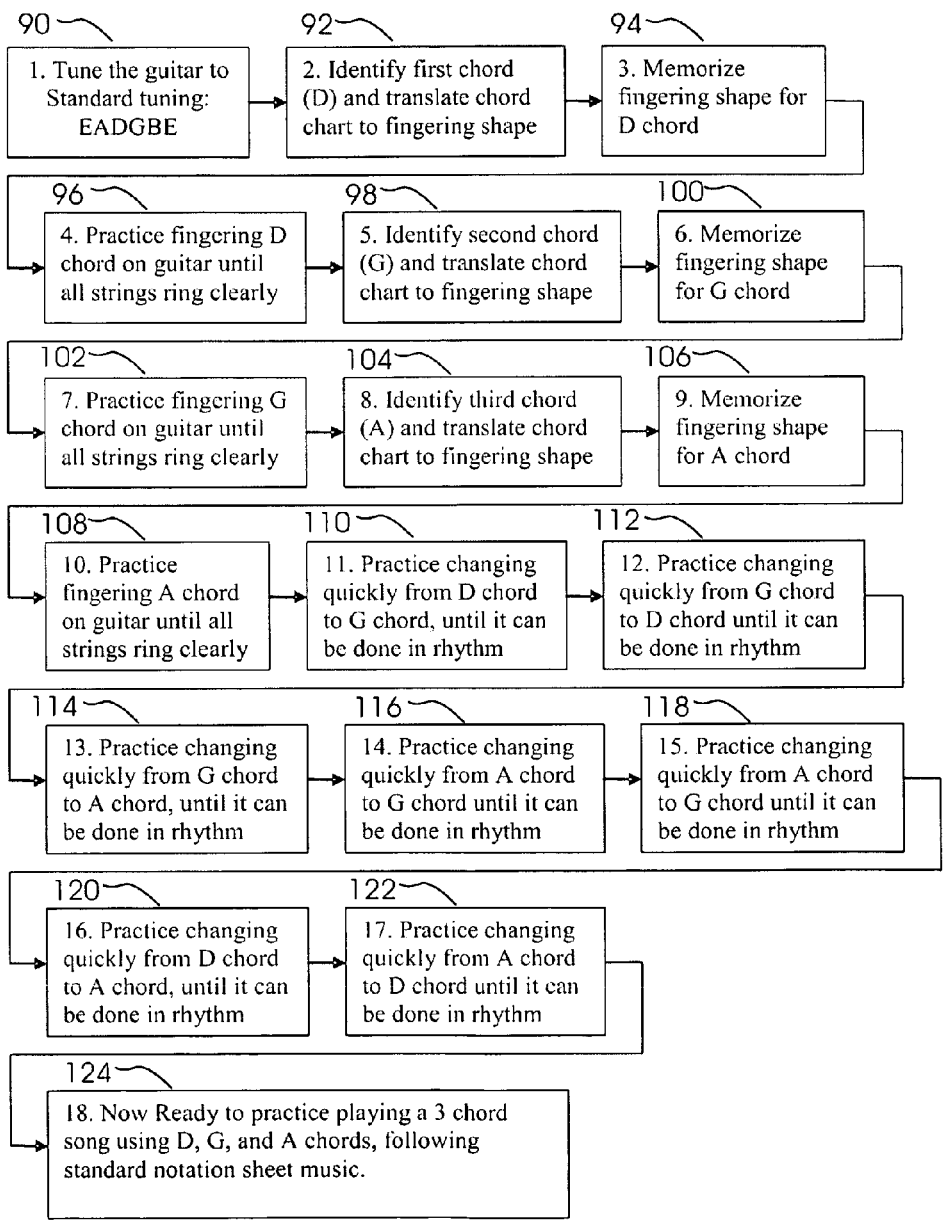
FIG. 11 is a flow chart for the prior art learning process for a 3 chord song using chords D, G, and A.

FIG. 11 is a flow chart that summarizes the prior art operational steps required to learn to play a song on the guitar with only 3 chords, D, G, and A. It should be noted that if any additional chords are added, a minimum of an additional 5 new operational steps must be added to the process for each chord added. These steps are roughly equivalent to processes (92), (94), and (96) of FIG. 11, identifying, memorizing and learning to finger the new chord shape, and processes (110) and (112) of FIG. 11, quickly changing to and from the new chord (from and to another chord) in rhythm. In addition to the learning process flow of the present invention being significantly shorter than the prior art learning process, virtually every step in the process is also significantly easier than prior art processes.

Another embodiment may include additional information in the notation system, including, but not limited to:

a. Common Music Notation for melody [FIG. 5 (60)] and/or harmony, b. Strum pattern information [FIG. 6 (62)]

c. Chord charts, tablature chord notation, and/or chord names

Figure 6:
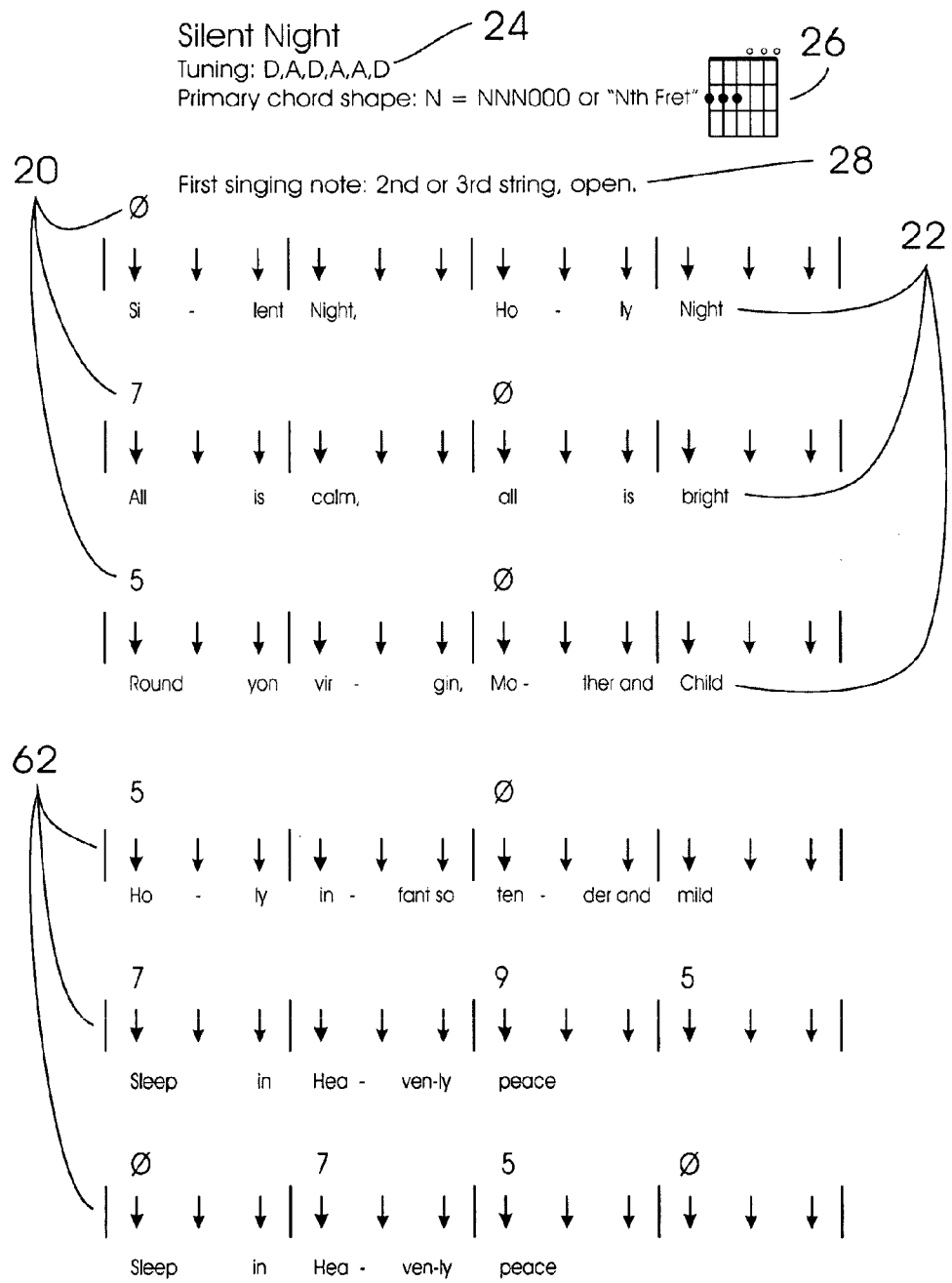
FIG. 6 is an additional embodiment of the notation system used in conjunction with strumming pattern information.

An embodiment with Common Music Notation is shown in FIG. 5. An embodiment with strum pattern information is shown in FIG. 6.

Figure 8:
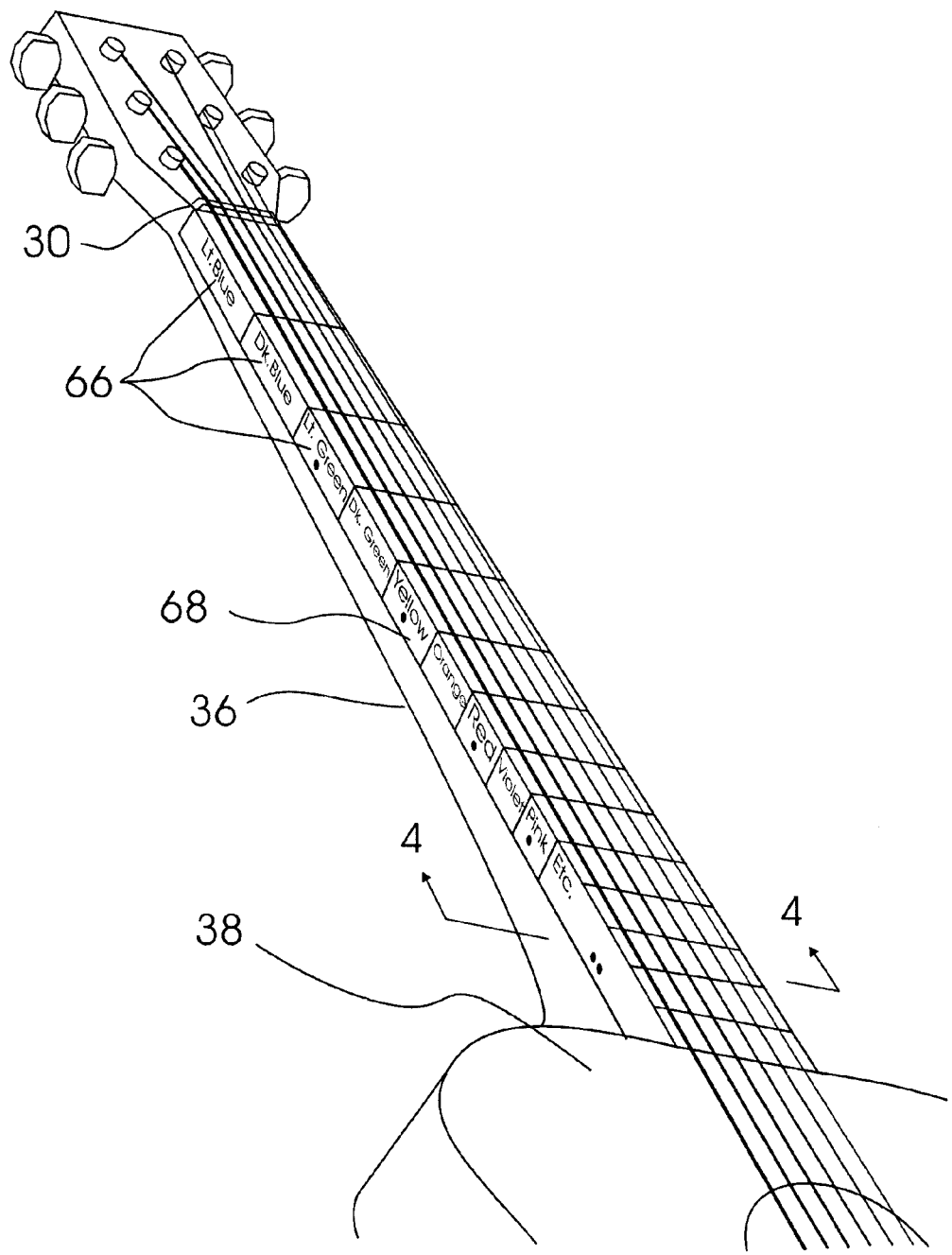
FIG. 8 is a perspective view of an alternate embodiment of the fret marking label shown with color names corresponding to the alternate embodiment of the notation system (FIG. 7).

The use of a number marking for the chord notation and the corresponding visual aid is a preferred embodiment for this notation system, however, since the notation system simply provides the user with the fret number position information for the location of the movable chord shape, the numbers can be replaced on both the notation system and the visual aid by a variety of matching alternate markings, including color bars, geometric shapes, animal shapes, etc. Although using numbers is probably the most logical, the actual symbols chosen are not significant, as long as the symbol used in the notation system matches the symbol used in the visual aid. A color bar notation system (64) and corresponding color bar visual aid (68) is illustrated in FIGS. 7 and 8.

For the special case of implementing the notation system and corresponding "visual" aid for users without sight, the notation system may be implemented in literary Braille (with the fret number inserted within the lyrics so the lyrics and the fret numbers can be read tactilely in a linear fashion) and the corresponding fret location visual aid replaced by a suitably positioned tactile aid along the back of the neck. One embodiment of the tactile aid is a Braille embossed adhesive label attached along the back of the neck in a position where the Braille fret numbers could be read tactilely by the user's thumb.

The method, notation system and visual aid can be applied to many variations of tuning of the instrument. A family of tunings similar to the tuning discussed above (D,A,D,A,A,D) can be used to transpose the chord progression. For example, changing the top three strings from "A,A,D" to "E,E,A" (tuning: D,A,D,E,E,A) transposes the chord progression up 7 frets, with the "7" chord becoming the root diatonic chord in the key of A. The root can be transposed to any other key and fret by choosing different top three strings in a similar manner.

Additional tunings can be used with primarily one chord shape, such as D,A,A,A,A,D, where the movable chord shape is reduced to two strings (N=NN0000), or a tuning such as B,G,D,D,D,D, where the movable chord shape is (N=N, N+1, 0000), etc.

Additional chord shapes, etc., may be used to expand the usefulness of the method as a user advances in skill level. Some examples of expanded chord symbols are: Use of parentheses around the number could indicate primarily strumming the bass string only [as in: (5)=5xxxxx], use of the letter F after a chord number could indicate use of a full bar in lieu of a partial bar, use of an M after a chord number could indicate muting of the top 3 strings (as in: 5F=555555 or 5M=555xxx), and use of an asterisk or other symbol after a chord number could indicate an alternate chord shape (an additional chord shape of note is N*=N, N+1, N, 000, as in: 4*=454000).

Although the descriptions above contains many specificities, these should not be construed as limiting the scope of the embodiment but as merely providing illustrations of some of the presently preferred embodiments. For example, the notation system could be implemented with the label $7^{th}$, or "$7^{th}$ fret" instead of just the numeral 7, or use other means to identify the fret space on the instrument to implement the movable chord fingering. Therefore, the scope of the embodiment should be determined by the appended claims and their legal equivalents, rather than by the examples given.

What is claimed is:

1. A musical chord notation system for playing the guitar, banjo, ukulele, or similar stringed instrument with a plurality of strings and a plurality of frets, where implied major, implied minor, actual major and actual minor chords are produced by strumming all of the strings on the instrument using the following information:

a) guitar tuning information, where the tuning of the strings on the instrument conforms to the following description:
1) the bass strings, defined as the lower one-third to three-fourths of the total number of strings on the instrument, are tuned to only a root or lowest note, the major fifth note above the root note, and, optionally, unisons and octaves of said notes, and
2) the treble strings, defined as the upper one-fourth to two-thirds of the total number of strings on the instrument, are tuned in one of two ways:
   a) to only octaves of the root note and octaves of the major fifth note above the root note, or
   b) to only octaves of the root note and octaves of the major fifth note above the root note transposed by the same interval, and b) chord fingering information specifying a multiple string partial bar shape, where the bass strings are fretted in the same fret space and the treble strings are left unfretted,
c) capo positioning, and
d) a single letter, number, color or symbol that specifies the fret space location where the above chord fingering is implemented, producing a unique chord, defined as a minimum of a unique root note along with the major fifth note in the root note's scale, for each fret space location specified.

2. The notation system of claim 1 used for songs, wherein said letters, numbers, colors or symbols is shown in relation to the words of the song to indicate the approximate timing of chord changes.

\* \* \* \* \*